(12) United States Patent
Pilipchuk (10) Patent No.: US 8,175,269 B2
(45) Date of Patent: May 8, 2012

(54) SYSTEM AND METHOD FOR ENTERPRISE SECURITY INCLUDING SYMMETRIC KEY PROTECTION

(75) Inventor: Denis Pilipchuk, Winchester, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1312 days.

(21) Appl. No.: 11/428,736

(22) Filed: Jul. 5, 2006

(65) Prior Publication Data

US 2008/0008316 A1    Jan. 10, 2008

(51) Int. Cl.
*G06F 21/00* (2006.01)

(52) U.S. Cl. .......... 380/45; 726/22; 713/189; 713/173; 713/176; 380/277; 705/59; 709/219; 455/419; 717/174

(58) Field of Classification Search ............... 380/45, 380/277; 713/156
See application file for complete search history.

(56) References Cited

U.S. PATENT DOCUMENTS

| | | | | |
|---|---|---|---|---|
| 6,233,341 B1 * | 5/2001 | Riggins | | 380/277 |
| 6,490,680 B1 * | 12/2002 | Scheidt et al. | | 713/166 |
| 7,051,211 B1 * | 5/2006 | Matyas et al. | | 713/187 |
| 7,603,563 B2 * | 10/2009 | Ansell et al. | | 713/182 |
| 2002/0152392 A1 * | 10/2002 | Hardy et al. | | 713/189 |
| 2004/0162989 A1 * | 8/2004 | Kirovski | | 713/189 |
| 2005/0246285 A1 * | 11/2005 | Chakravarthy et al. | | 705/59 |
| 2006/0020811 A1 * | 1/2006 | Tan | | 713/180 |
| 2006/0195689 A1 * | 8/2006 | Blecken et al. | | 713/156 |
| 2006/0200857 A1 * | 9/2006 | Yokota | | 726/6 |
| 2007/0100762 A1 * | 5/2007 | Luo et al. | | 705/59 |
| 2007/0169003 A1 * | 7/2007 | Branda et al. | | 717/130 |
| 2007/0220500 A1 * | 9/2007 | Saunier | | 717/162 |

OTHER PUBLICATIONS

Hall et al., A cooperative approach to support software deployment using the Software Dock, Date: May 22, 1999, pp. 174-183.*

Fiskiran et al., "Runtime execution monitoring (REM) to detect and prevent malicious code execution", Computer Design: VLSI in Computers and Processors, 2004. ICCD 2004. Proceedings. IEEE International Conference on, Oct. 11-13, 2004, pp. 452-457.*

* cited by examiner

*Primary Examiner* — Taghi Arani
*Assistant Examiner* — Morshed Mehedi
(74) *Attorney, Agent, or Firm* — Fliesler Meyer LLP (57) ABSTRACT

A system and method for enterprise security including symmetric key protection. In accordance with an embodiment, the system provides a higher level of protection against unauthorized key disclosure by encrypting randomly generated seed data used for key generation, and using digital signatures and asymmetric encryption.

20 Claims, 6 Drawing Sheets

SYSTEM AND METHOD FOR ENTERPRISE SECURITY INCLUDING SYMMETRIC KEY PROTECTION

COPYRIGHT NOTICE

A portion of the disclosure of this patent document contains material which is subject to copyright protection. They copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to enterprise software, application servers, and to methods for providing security in an enterprise software installation.

BACKGROUND

When an enterprise software application or an application server product is installed at an organizations site, there is usually a need to prevent unauthorized parties from reading or modifying any information that controls the behavior of that software application. As referred to herein, examples of such enterprise software applications and application servers include the WebLogic Server product, and the Aqualogic Server product, both from BEA Systems, Inc. When installed, these products invariably include important information such as system configuration parameters, and sensitive customer data. Sometimes, this information is secured by encrypting the information using a symmetric key, which in turn is stored on the system's hard drive. However, when the symmetric key is stored in an unencrypted form on the system, an unauthorized person could gain access to it, and could use they key to read and modify application configuration parameters, or customer data.

An unauthorized party can gain accessed to a symmetric key in different ways. For example, a user that gains access to either the Administrator account on the local machine, becomes a member of a security group which allows administrative access to the system, or otherwise circumvents the system security, can directly read the symmetric key from the system hard drive. Alternatively; the symmetric key can sometimes be read if the computer is booted using a different operating system. Another approach is to read the symmetric key from unencrypted backup tapes or backup media.

A popular approach for protecting symmetric keys in enterprise software systems consists of embedding the key (or some data that is necessary for the key generation) into the software application binaries when they are first shipped from the software developer to the end user or customer. This embedded (or derivable) key is then used to start the protection chain by encrypting the secret and private keys stored on the system disk. While this approach represents an improvement over the use of basic unencrypted symmetric keys, it also has two significant shortcomings. First, since either the embedded key or the algorithm needed for its derivation is static and well-known, then extracting it and openly publishing it significantly reduces its protection qualities. Second, the technique is open to substitution and identity spoofing attacks; since any information encrypted by this key, including the application's symmetric keys on the disk; may be silently substituted without detection.

For any key protection scheme to be absolute; it should preferably require some external input for initialization—for example, in the form of a keyboard password or a private key stored on a removable hardware device. Otherwise, an attacker who has access to the same resources as the application itself will always be able to follow the algorithm's steps to arrive at the same results. This creates a problem with enterprise software applications and application servers, which are designed to be automatically restartable in the case of failure or for administrative reasons. Therefore, most traditional approaches to key protection cannot support a requirement for automatic restarts, while simultaneously providing a strong protection scheme that uses off-system storage of key data. The variety of different schemes that are available today vary only in the level of effort necessary to discern the desired key.

SUMMARY

The present invention relates to enterprise software, application servers, and to methods for providing security in an enterprise software installation. In accordance with an embodiment, the system provides a higher level of protection against unauthorized key disclosure by encrypting randomly generated seed data used for key generation, and using digital signatures and asymmetric encryption. Additional embodiments and modifications will be evident from the following description,

DETAILED DESCRIPTION

The present invention relates to enterprise software, application servers and to methods for providing security in an enterprise software installation. In accordance with an embodiment, the system provides a higher level of protection against unauthorized key disclosure by encrypting randomly generated seed data used for key generation, and using digital signatures and asymmetric encryption.

As described herein if a data element is to be used by all installations of a software application then it is prefixed with the qualifying term "application". For example, if a keypair is to be used by all installations of an software application it is called the "application-keypair". Similarly, if a data element is to be used by a single, specific installation of a software application it is prefixed with the qualifying term "instance". For example, if a keypair is to be used by a single, specific installation of an software application it is called the "instance-keypair". As a general rule, in order to avoid storing secret keys on disk, they are derived at runtime in the application code using some combination of data obtained from different sources. As referred to herein, this data is called the "base-secret" and any installation will possess two secrets: an instance-base-secret and an application-base secret.

Figure 1:
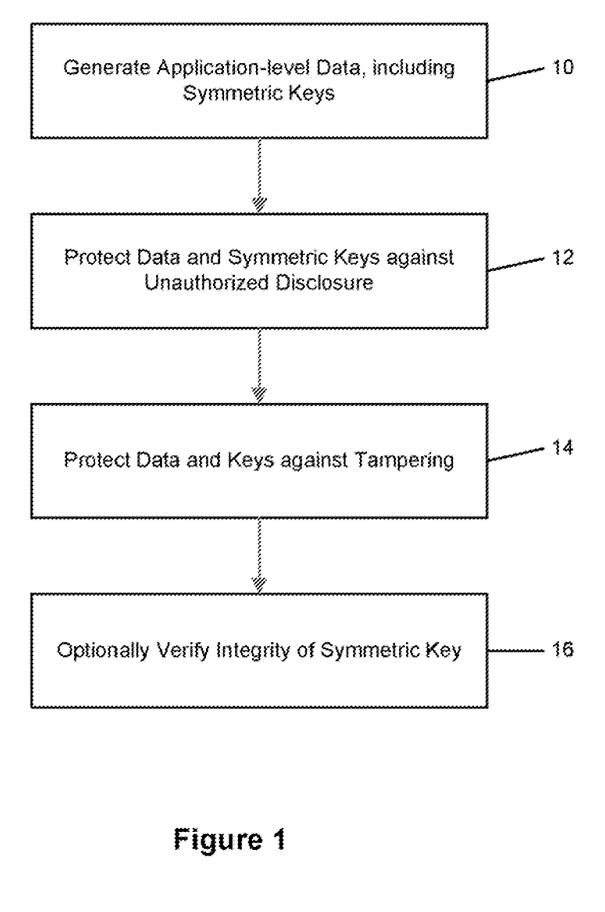
FIG. 1 shows a flowchart that illustrates the high level flow of a method in accordance with an embodiment of the invention.

FIG. 1 shows a flowchart that illustrates the high level steps of a method in accordance with an embodiment of the invention. As shown in FIG. 1 in step 10 the process is designed to generate application-level and instance-level data, including base-secrets and symmetric keys. In step 12, the application-level data and instance-level data is protected against unauthorized disclosure using an encryption method. In step 14, the data is further protected against tampering by using a certificate authority and signatures. In step 16, the integrity of the symmetric keys can be verified by the system on an occasional or periodic basis, or by an installed application component. Each of these steps are described in further detail below.

Generation of Application Level Data

Figure 2:
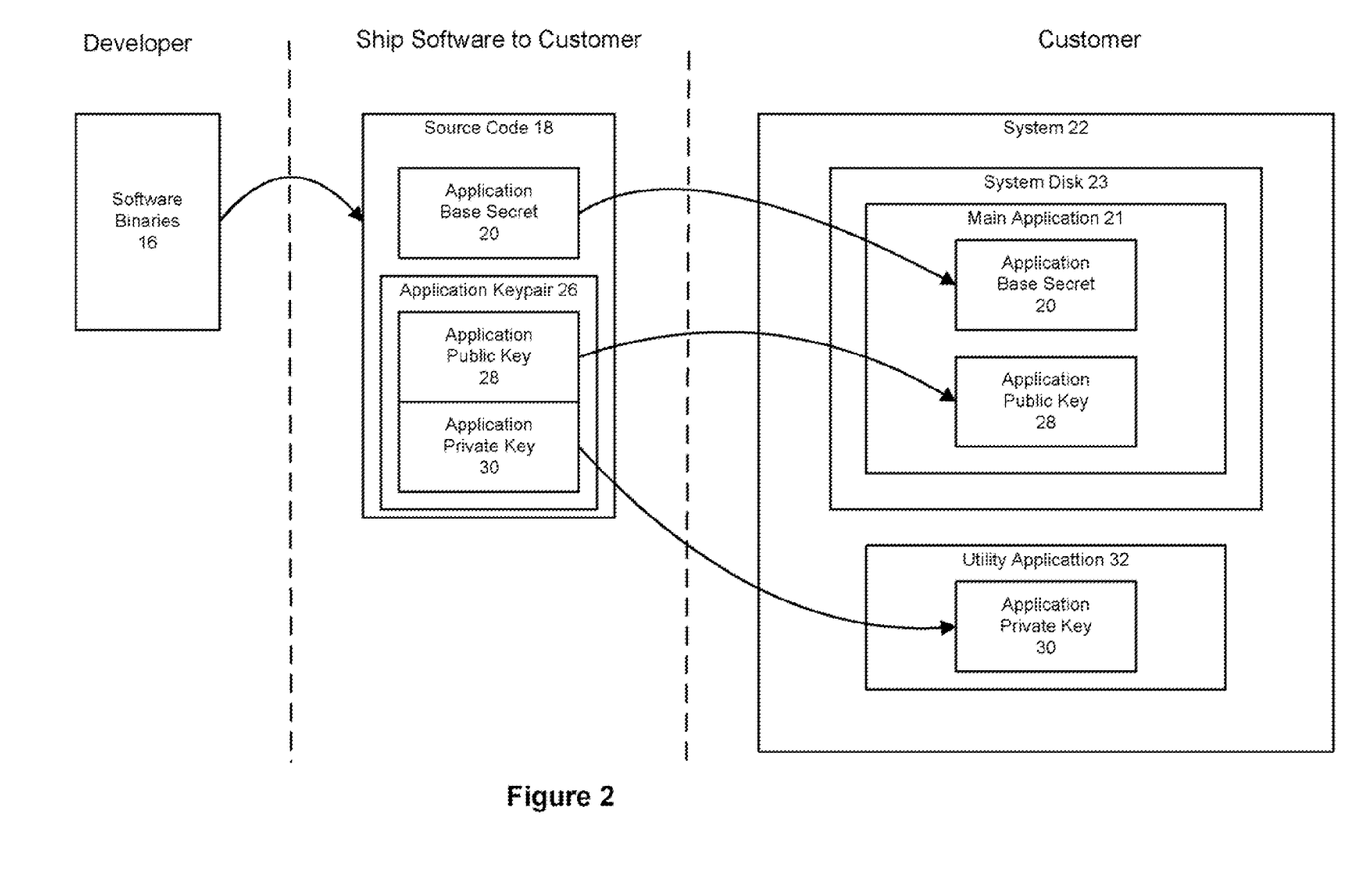
FIG. 2 shows an illustration of how an application public key and an application private key are used with the system, in accordance with an embodiment of the invention.

As shown in FIG. 1, the first step 10 in the process is to generate and deploy a data that will be available to all installations of the application. FIG. 2 illustrates this step in more detail, In accordance with an embodiment, when the software application binary files or executables 16 are first developed, built and then shipped on a computer readable medium to the end-user or customer, a value or sequence is embedded into the source code 18 of the system. This value is the application-base-secret 20, and will be shared by all installations of the application. The application-base-secret can be a 128-byte long random sequence of bytes, although other types of value, sequence, or base-secret can be used. During installation of the application and its various components the application-base-secret is copied to the system 22 and is stored on the system disk 23 to be shared by all installations of the application. In accordance with an embodiment, the embedded sequence can also be protected by an obfuscation scheme, such as Base64-encoding, to prevent direct lookup of the base secret in the application's binary code.

In accordance with an embodiment a unique keypair is also embedded into the source code of the system. This keypair is the application-keypair 26. The application-keypair can be an RSA keypair, or another type of key pair system can be used. The public key 28 of the application-keypair is embedded into the main software application 21, together with the application-base-secret, and is similarly copied to the system disk to be shared by all installations of the application. The private key 30 of the application-keypair is embedded into a separate utility application 32 which is not installed on the disk with the rest of the application binaries, bus is available for use by the system.

In accordance with an embodiment, the embedded keys can also be protected by an obfuscation scheme, such as Base64-encoding, to prevent direct lookup of the keys in the application's binary code.

Protection Against Unauthorized Disclosure

Figure 3:
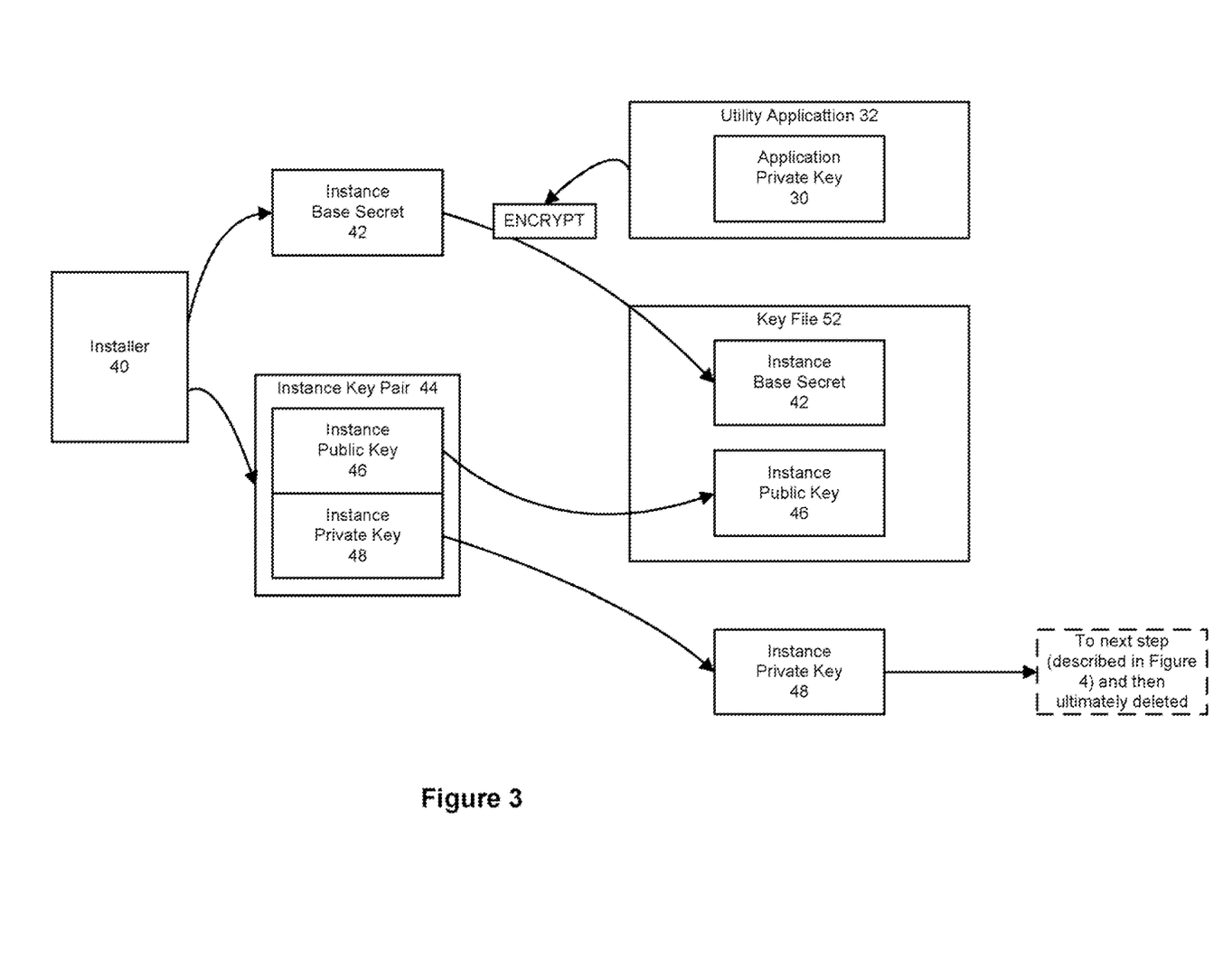
FIG. 3 shows an illustration of how an instance public key and an instance private key are generated, in accordance with an embodiment of the invention.

As shown in FIG. 1, the next high level step 12 in the process is to protect both the application-level and instance-level data against unauthorized disclosure, using an encryption method, FIG. 3 illustrates the protection process in more detail. In accordance with an embodiment, during installation at the customers site application installers or enrollers are utility applications that are used for installing the application product and its components. Each installer 40 generates a value or sequence referred to herein as the instance-base-secret 42. In accordance with an embodiment the instance-base-secret can be a 128-byte long random sequence of bytes, although other types of value, sequence, or base-secret can be used. At the same time, during installation, another unique keypair is created, which represents the components instance. This is the instance-keypair 44. In accordance with an embodiment, a symmetric key can be derived by taking the first 24 bytes of an SHA1 hash from the combined array of the application-base-secret and the instance-base-secret. In accordance with an embodiment the instance-keypair is also an RSA keypair, although other keypair types can be used. The public key 46 of the instance-keypair is stored in a separate keyfile file 52 together with the instance-base-secret 42. Before saving the instance-base-secret to the keyfile, it is encrypted by the private key 30 from the application-keypair. The instance-public key can also be saved in the installation log file for auditing purposes. The instance-private key 48 will be used in the next step in the process, to protect the secrets and keys against tampering, and will be then ultimately removed at the end of the installation/enrollment process.

Figure 4:
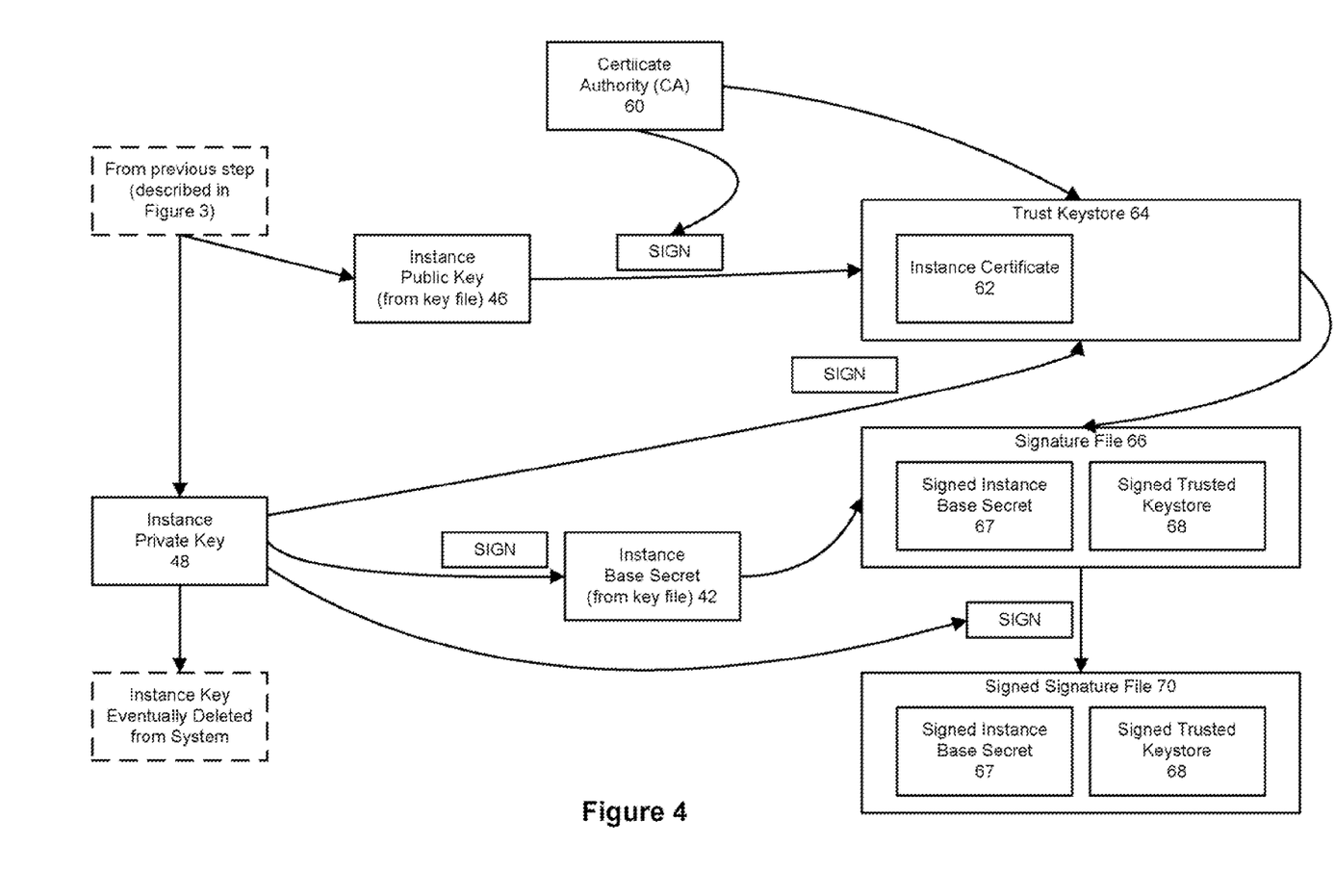
FIG. 4 shows an illustration of how a signature file is created in accordance with an embodiment of the invention.

Protecting Against Tampering:

As shown in FIG. 1, the next high level step in the process is to protect the data against tampering using a certificate authority and signatures. FIG. 4 illustrates this protection against tampering in more detail.

In accordance with an embodiment, the system provides greater protection that traditional methods against an identity spoofing threat, for example, a threat resulting from substituting the instance-base-secret. To prevent this an instance-certificate 62 is created by first signing the instance-public key 46 by a certificate authority (CA) 60 (which can, for example, be the Administration Server's internal CA). The instance-private key 48 is then used to digitally sign both the instance-base-secret 42 and the trust keystore 64 which stores the CA entry, The resulting signatures 67, 68 are placed into the signature file 66. The contents of the signature file are then sealed, to create a signed signature file 70, by signing the signature file with the instance-private key 48 (which was generated in the previous step described above). The instance-private key can then be removed after completing the process, making the generated instance-base-secret and all of the signatures read-only.

In the event that either instance-base-secret or the trust keystore needs to be changed (for example, during a key rollover), the whole process would need to be repeated, i.e. both a new instance-base-secret and a new instance-keypair must be re-generated. All of the entries, encrypted with the key based on the old instance-base-secret (for example, any entries in the password.xml file or password fields in the provider's data), would have to be re-encrypted.

Verification Steps

Figure 5:
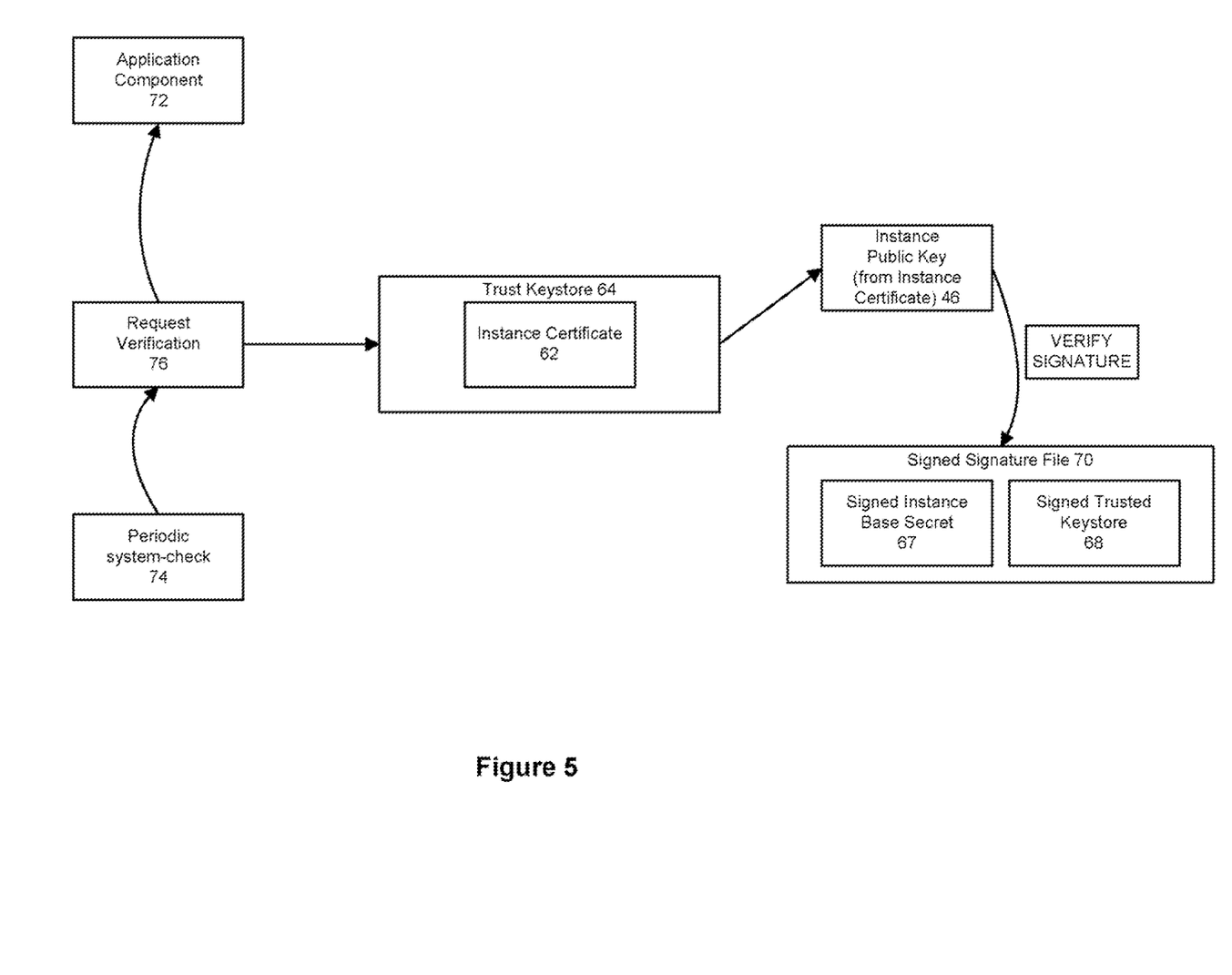
FIG. 5 shows an illustration of how verification is performed in accordance with an embodiment of the invention.

As shown in FIG. 1, the final step in the method is to verify the integrity of the symmetric keys, either on an occasional, per-request, or periodic basis. FIG. 5 illustrates this step in more detail in accordance with an embodiment, the system provides protection against any tampering with the instance certificate and the trust store using a two-tiered process. Locally installed application components can verify the integrity of the instance-certificate and all signatures which are made using the instance-private key. However, verification of the certificate's authenticity must be done externally, since the local host is unable to reliably establish a trusted base by itself.

Before using its public key, the instance-certificate must be verified using the CA certificate from the trust store. The trust store should not be encrypted, nor should access to the trust store be dependent on the results of this verification step. The instance-certificate is then used to verify the signatures of the trust store and the instance base secret, that were previously stored in the signature file. To establish the trusted base and protect against tampering with the CA record, in accordance with an embodiment, the Administration Server runs a service that is responsible for periodically contacting any registered hosts and verifying the integrity of their instance-certificates, which must also be signed by the Administration Server's CA.

As shown in FIG. 5, an application component 72, or the system itself 74, can make a request for verification 76. The instance-certificate 62 is retrieved from the trust keystore 64, and is used to verify the signatures of the trust keystore 67 and the instance base secret 68, which were previously stored in the signature file 70.

Figure 6:
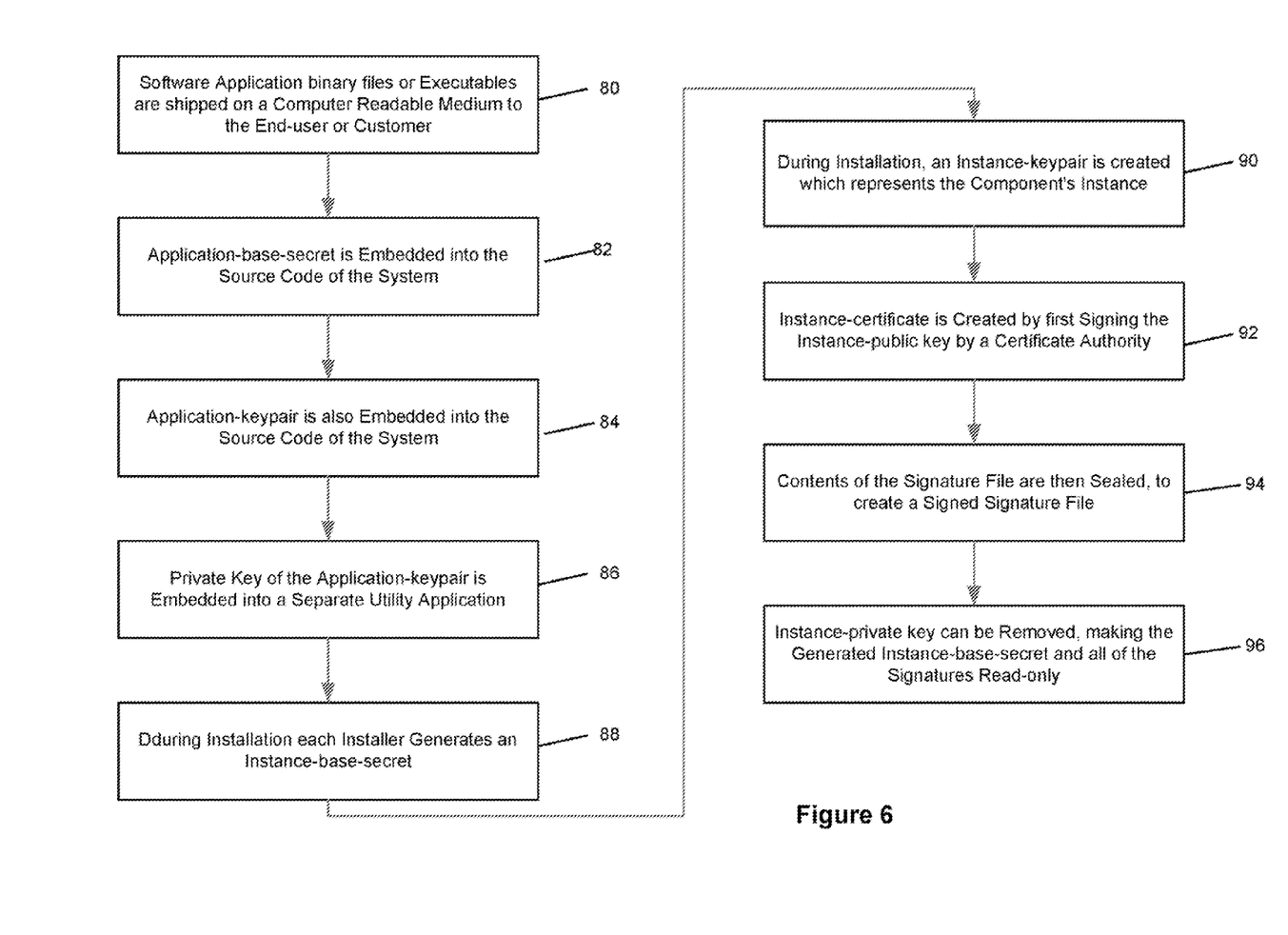
FIG. 6 shows a flowchart that illustrates in more detail the flow of a method in accordance with an embodiment of the invention.

FIG. 6 shows a flowchart that illustrates in more detail the flow of a method in accordance with an embodiment of the invention. As shown in FIG. 6, in step 80, the software application binary files or executables are developed, built and then shipped on a computer readable medium to the end-user or customer. In step 82, an application-base-secret is embedded into the source code of the system. During installation of the application and its various components, the application-base-secret is copied to the system and is stored on the system disk to be shared by all installations of the application. In step 84, an application-keypair is also embedded into the source code of the system. The public key of the application-keypair is embedded into the main software application, together with the application-base-secret, and is similarly copied to the system disk to be shared by all installations of the application. In step 86, the private key of the application-keypair is embedded into a separate utility application which is not installed on the disk with the rest of the application binaries, but is available for use by the system. In step 88, during installation at the customer's site each installer generates an instance-base-secret. At the same time during installation, in step 90, an instance-keypair is created which represents the component's instance. The public key of the instance-keypair is stored in a separate keyfile file together with the instance-base-secret, Before saving the instance-base-secret to the keyfile, it is encrypted by the private key from the application-keypair. In step 92, an instance-certificate is created by first signing the instance-public key by a certificate authority. The instance-private key is then used to digitally sign both the instance-base-secret and the trust keystore which stores the CA entry. The resulting signatures are placed into the signature file. In step 94, the contents of the signature file are then sealed, to create a signed signature file. In step 96, the instance-private key can then be removed after completing the process, making the generated instance-base-secret and all of the signatures read-only.

Appendix A

In accordance with an embodiment, the techniques described above may be incorporated into an application server product, such as the AquaLogic User Interaction (ALUI) product from BEA Systems, Inc. This section describes the implementation steps needed implement an embodiment of the invention in an existing software application using a multi-phased approach. During the first phases the software application's build infrastructure is modified to:

Generate a random Base64-encoded application-base-secret and build it into software application's code. Builds for trial versions of the software should also produce different base secrets; and Generate a keypair (application-keypair) and build it into software application's code. Builds for trial versions of the software should also produce different application-keypairs.

The installation code for the various software application components is modified to:

Generate an instance-base-secret;
Encrypt the generated instance-base-secret using the application-keypair and key utility; and
The encrypted instance-base-secret is Base64-encoded.

Any shared software application key handling classes are modified to produce a 3DES key in memory by performing the following operations:

Load and decode the instance-base-secret;
Decode the application-public-key;
Decrypt the instance-base-secret;
Decode the application-base-secret;
Combine both secrets into a single byte array;
Generate a SHA1 hash of the combined byte array; and
Create the desired symmetric key by taking first 8 bytes of the resulting hash as IV, and next 24 bytes—as the key itself.

For the second phases enrollment code and installation code for various software application components is modified to:

Generate an instance-keypair for the component's instance;
Sign the instance-base-secret, trust store, and the signature file itself;
Delete the instance private key; and
Generate CSR for the instance public key and have it signed by the Administration Server's internal CA.

Any shared software application runtime code is modified to.

Load instance public key from the instance certificate;
Load instance's trust keystore;
Verify instance-certificate using ca entries in the loaded trust keystore; and
Using instance-certificate, verify signatures of instance-base-secret and the trust store, stored in the signature file, and of the of the signature file itself.

For the third phase, enrollment code and installation code for various software application components is modified to:

Create a single set of keys, representing the host, at the local instance of the installed component for shared use by all locally other installed components and to represent this host to the external clients; and
Keep track of enrolled hosts and their addresses.

The runtime code of software application is modified to:
Periodically contact software application components on enrolled hosts and check integrity of their instance certificate.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiments of the systems and methods described above are described in the context of a Weblogic environment, it will be evident that the system and methods may be used with other types of enterprise software applications and application servers. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer executable method for deploying a symmetric key in a software application comprising the steps of:
   providing a software application as source code for installation at a plurality of computer systems;
   providing an application-base-secret, associated with the source code, which is accessible by all installed instances of the software application at the plurality of computer systems;
   providing an application-keypair, associated with the source code, which includes an application public key and an application private key, wherein the application public key of the application-keypair is also accessible by all of the installed instances of the software application, and wherein the application private key is associated with a utility application;
   using the utility application to install a particular instance of the software application at a particular computer system, including, for the particular instance
      generating, at the time of installation of the particular instance of the software application at the particular computer system, an instance-base-secret which is unique to the particular instance of the software application,
      encrypting the instance-base-secret using the application private key from the application-keypair that is associated with the utility application,
      generating an instance-keypair, using the application-base-secret and the instance-base-secret, which includes an instance public key and an instance private key, wherein the instance-keypair is also unique to the particular instance of the software application,
      creating an instance certificate using a certificate authority and the instance public key from the instance-keypair, so that the instance certificate is unique to the particular instance of the software application,
      creating a digital signature of the encrypted instance-base-secret using the instance private key of the instance-keypair, and using the digital signature to sign the instance certificate,
      associating the instance certificate with the particular instance of the software application, and
      removing the instance private key; and
   thereafter periodically verifying the authenticity of the instance certificate.

2. The method of claim 1 wherein the symmetric key is derived by combining the application-base-secret and the instance-base-secret.

3. The method of claim 1 wherein the application-base-secret and application-keypair is embedded in the software application's source code.

4. The method of claim 1 wherein the instance certificate is periodically verified by checking it against a certificate authority.

5. The method of claim 1, wherein the method further comprises
   removing the private key of the instance-keypair from the installation of the software application so that the encrypted instance-base-secret and the digital signatures of the instance-base-secret is read-only.

6. The method of claim 1, wherein the source code is stored on a computer readable medium, together with the application-base-secret and the application-keypair, prior to installation of the software application so that they are accessible to each of the installed instances of the software application, and wherein the instance-base-secret and the instance-keypair are subsequently generated by an installer at the computer system during installation of the particular instance of the software application.

7. The method of claim 1, wherein a public key of the application-keypair is copied to a system disk to be subsequently shared by all installations of the application, and wherein a private key of the application-keypair is embedded into a separate utility application which is not installed on the disk with the rest of the application binaries, but is made available for use by the system upon request.

8. The method of claim 4, wherein the instance certificate for the particular instance of the software application is periodically verified by accessing the instance certificate associated with that instance, retrieving its public key, and using that to verify the instance-base-secret previously stored in the digital signature.

9. A system for use in deploying a symmetric key in a software application comprising:
   a microprocessor;
   a software application provided as source code for installation at a plurality of computer systems;
   an application-base-secret, provided within the source code of the software application, wherein the application-base-secret is accessible by all installed instances of the software application at the plurality of computer systems;
   an application-keypair, which includes an application public key and an application private key, provided within the source code of the software application, wherein the application public key of the application-keypair is accessible by all installed instances of the software application, and wherein the application private key is associated with a utility application; and
   an installer at a particular computer system that incorporates the utility application and that
      generates, at the time of installation of the software application, an instance-base-secret wherein the instance-base-secret is unique to a particular instance of the software application at the particular computer system,
      encrypts the instance-base-secret using the application private key from the application-keypair that is associated with the utility application,
      generates, during installation of the software application, an instance-keypair, using the application-base-secret and the instance-base-secret, which includes an instance public key and an instance private key, wherein the instance-keypair is also unique to the particular instance of the software application,
      creates an instance certificate using a certificate authority and the instance public key from the instance-keypair, so that the instance certificate is unique to the particular instance of the software application, creates a digital signature of the encrypted instance-base-secret using the instance private key of the instance-keypair, and uses the digital signature to sign the instance certificate, associates the instance certificate with the particular instance of the software application, and removes the instance private key; and wherein the authenticity of the instance certificate is thereafter periodically verified.

10. The system of claim 9, wherein the installer further, after creating the instance certificate and the digital signature, removes the private key of the instance-keypair from the installation of the software application.

11. The system of claim 9, wherein the source code is stored on a computer readable medium, together with the application-base-secret and the application-keypair, prior to installation of the software application so that they are accessible to each of the installed instances of the software application, and wherein the instance-base-secret and the instance-keypair are subsequently generated by an installer at the computer system during installation of the particular instance of the software application.

12. The system of claim 9, wherein a public key of the application-keypair is copied to a system disk to be subsequently shared by all installations of the application, and wherein a private key of the application-keypair is embedded into a separate utility application which is not installed on the disk with the rest of the application binaries, but is made available for use by the system upon request.

13. The system of claim 9, wherein the instance certificate for the particular instance of the software application is periodically verified by accessing the instance certificate associated with that instance, retrieving its public key, and using that to verify the instance-base-secret previously stored in the digital signature.

14. A non-transitory computer readable medium, including instructions stored thereon, which when read and executed by a computer cause the computer to perform the steps comprising:

receiving a software application as source code, for installation at the computer;

retrieving, from within the source code of the software application, an application-base-secret which is accessible by all installed instances of the software application;

retrieving, from within the source code of the software application, an application-keypair, which includes an application public key and an application private key, wherein the application public key of the application-keypair is also accessible by all installed instances of the software application, and wherein the application private key is associated with a utility application;

installing a particular instance of the software application at a particular computer system, using the utility application, including, for the particular instance, generating, at the time of installation of the particular instance of the software application at the particular computer system, an instance-base-secret which is unique to the particular instance of the software application, encrypting the instance-base-secret using the application private key from the application-keypair that is associated with the utility application, generating an instance-keypair, using the application-base-secret and the instance-base-secret, which includes an instance public key and an instance private key, wherein the instance-keypair is also unique to the particular instance of the software application, creating an instance certificate using a certificate authority and the instance public key from the instance-keypair, so that the instance certificate is unique to the particular instance of the software application, creating a digital signature of the encrypted instance-base-secret using the instance private key of the instance-keypair, and using the digital signature to sign the instance certificate, associating the instance certificate with the particular instance of the software application, and removing the instance private key; and thereafter periodically verifying the authenticity of the instance certificate.

15. The method of claim 1, further comprising storing an entry for the certificate authority in a trust keystore;

creating a digital signature of the encrypted instance-base-secret and the trust keystore, using the private key of the instance-keypair; and deleting the private key associated with the instance.

16. The method of claim 1, wherein the step of periodically verifying the authenticity of the instance certificate includes retrieving the instance certificate from the trust keystore, and using it to verify the signatures of the trust keystore and the instance base secret.

17. The system of claim 9, further comprising the steps of:

storing an entry for the certificate authority in a trust keystore;

creating a digital signature of the encrypted instance-base-secret and the trust keystore, using the private key of the instance-keypair; and deleting the private key associated with the instance.

18. The system of claim 9, wherein the step of periodically verifying the authenticity of the instance certificate includes retrieving the instance certificate from the trust keystore, and using it to verify the signatures of the trust keystore and the instance base secret.

19. The method of claim 1, wherein the step of using the utility application to install the particular instance of the software application at a particular computer system, further includes creating and storing a keyfile that includes the instance base secret and the instance public key.

20. The system of claim 9, wherein the utility application used to install the particular instance of the software application at a particular computer system, further creates and stores a keyfile that includes the instance base secret and the instance public key.

* * * * *

UNITED STATES PATENT AND TRADEMARK OFFICE
CERTIFICATE OF CORRECTION

PATENT NO.      : 8,175,269 B2
APPLICATION NO. : 11/428736
DATED           : May 8, 2012
INVENTOR(S)     : Pilipchuk It is certified that error appears in the above-identified patent and that said Letters Patent is hereby corrected as shown below:

The title page showing the illustrative figure should be deleted to be replaced with the attached title page.

In the drawings: on sheet 2 of 6, in figure 2, Box No. 32, line 1, delete "Applicattion" and insert -- Application --, therefor.

In the drawings: on sheet 3 of 6, in figure 3, Box No. 32, line 1, delete "Applicattion" and insert -- Application --, therefor.

In the drawings: on sheet 4 of 6, in figure 4, Box No. 60, line 1, delete "Certiicate" and insert -- Certificate --, therefor.

In the drawings: on sheet 6 of 6, in figure 6, Box No. 88, line 1, delete "Dduring" and insert -- During --, therefor.

In the drawings: sheet 6 consisting of Fig. 6, should be deleted to be replaced with the drawing sheet, consisting of Fig. 6, as shown on the attached pages.

In the Specifications:

In column 1, line 8, delete "They" and insert -- The --, therefor.

In column 1, line 25, delete "organizations" and insert -- organization's --, therefor.

In column 1, line 38, delete "they" and insert -- the --, therefor.

In column 1, line 47, delete "Alternatively;" and insert -- Alternatively, --, therefor.

In column 1, line 65, delete "attacks;" and insert -- attacks, --, therefor.

Signed and Sealed this
Twenty-first Day of May, 2013

Teresa Stanek Rea
*Acting Director of the United States Patent and Trademark Office*

In column 1, line 66, delete "disk;" and insert -- disk, --, therefor.

In column 2, line 1, delete "absolute;" and insert -- absolute, --, therefor.

In column 2, line 28, delete "description," and insert -- description. --, therefor.

In column 2, line 52, delete "servers" and insert -- servers, --, therefor.

In column 2, line 58, delete "herein" and insert -- herein, --, therefor.

In column 3, line 8, delete "Figure 1" and insert -- Figure 1, --, therefor.

In column 3, line 8, delete "10" and insert -- 10, --, therefor.

In column 3, line 23, delete "detail, In" and insert -- detail. In --, therefor

In column 3, line 32, delete "components" and insert -- components, --, therefor.

In column 3, line 39, delete "embodiment" and insert -- embodiment, --, therefor.

In column 3, line 61, delete "customers" and insert -- customer's --, therefor.

In column 4, line 2, delete "components" and insert -- component's --, therefor.

In column 4, line 32, delete "entry, The" and insert -- entry. The --, therefor.

In column 4, line 52, delete "detail in" and insert -- detail. In --, therefor.

In column 5, line 37-38, delete "instance-base-secret," and insert -- instance-base-secret. --, therefor.

In column 5, line 57, delete "phases" and insert -- phase, --, therefor.

In column 6, line 15, delete "phases" and insert -- phase, --, therefor.

In column 6, line 26, delete "to." and insert -- to: --, therefor.

In column 6, line 33, delete "of the of the" and insert -- of the --, therefor.

In column 6, line 51, delete "embodiments" and insert -- embodiments, --, therefor.

CERTIFICATE OF CORRECTION (continued)

(12) United States Patent
Pilipchuk (10) Patent No.: US 8,175,269 B2
(45) Date of Patent: May 8, 2012

(54) SYSTEM AND METHOD FOR ENTERPRISE SECURITY INCLUDING SYMMETRIC KEY PROTECTION

(75) Inventor: Denis Pilipchuk, Winchester, MA (US)

(73) Assignee: Oracle International Corporation, Redwood Shores, CA (US)

(*) Notice: Subject to any disclaimer, the term of this patent is extended or adjusted under 35 U.S.C. 154(b) by 1312 days.

(21) Appl. No.: 11/428,736

(22) Filed: Jul. 5, 2006

(65) Prior Publication Data
US 2008/0008316 A1 Jan. 10, 2008

(51) Int. Cl.
G06F 21/00 (2006.01)

(52) U.S. Cl. ........ 380/45; 726/22; 713/189; 713/173; 713/176; 380/277; 705/59; 709/219; 455/419; 717/174

(58) Field of Classification Search .......... 380/45, 380/277; 713/156
See application file for complete search history.

(56) References Cited

U.S. PATENT DOCUMENTS

| | | | |
|---|---|---|---|
| 6,233,341 B1* | 5/2001 | Riggins | 380/277 |
| 6,490,680 B1* | 12/2002 | Scheidt et al. | 713/166 |
| 7,051,211 B1* | 5/2006 | Matyas et al. | 713/187 |
| 7,603,563 B2* | 10/2009 | Ansell et al. | 713/182 |
| 2002/0152392 A1* | 10/2002 | Hardy et al. | 713/189 |
| 2004/0162989 A1* | 8/2004 | Kirovski | 713/189 |
| 2005/0246285 A1* | 11/2005 | Chakravarthy et al. | 705/59 |
| 2006/0020811 A1* | 1/2006 | Tan | 713/180 |
| 2006/0195689 A1* | 8/2006 | Blecken et al. | 713/156 |
| 2006/0200857 A1* | 9/2006 | Yokota | 726/6 |
| 2007/0100762 A1* | 5/2007 | Luo et al. | 705/59 |
| 2007/0169003 A1* | 7/2007 | Branda et al. | 717/130 |
| 2007/0220500 A1* | 9/2007 | Saunier | 717/162 |

OTHER PUBLICATIONS

Hall et al., A cooperative approach to support software deployment using the Software Dock, Date: May 22, 1999, pp. 174-183.*
Fiskiran et al., "Runtime execution monitoring (REM) to detect and prevent malicious code execution", Computer Design: VLSI in Computers and Processors, 2004. ICCD 2004. Proceedings. IEEE International Conference on, Oct. 11-13, 2004, pp. 452-457.*

* cited by examiner

Primary Examiner — Taghi Arani
Assistant Examiner — Morshed Mehedi
(74) Attorney, Agent, or Firm — Fliesler Meyer LLP (57) ABSTRACT

A system and method for enterprise security including symmetric key protection. In accordance with an embodiment, the system provides a higher level of protection against unauthorized key disclosure by encrypting randomly generated seed data used for key generation, and using digital signatures and asymmetric encryption.

20 Claims, 6 Drawing Sheets

Figure 6